United States Patent

Sciammarella et al.

[11] Patent Number: 5,956,035
[45] Date of Patent: Sep. 21, 1999

[54] MENU SELECTION WITH MENU STEM AND SUBMENU SIZE ENLARGEMENT

[75] Inventors: Eduardo Sciammarella; Andrew Proehl, both of New York; Kenneth Herndon, Suffern, all of N.Y.

[73] Assignees: Sony Corporation, Tokyo, Japan; Sony Electronics, Inc., Park Ridge, N.J.

[21] Appl. No.: 08/857,181

[22] Filed: May 15, 1997

[51] Int. Cl.[6] .................................................... G06F 3/00
[52] U.S. Cl. ........................................................ 345/353
[58] Field of Search ................................... 345/326–358, 345/145–146, 439

[56] References Cited

U.S. PATENT DOCUMENTS

| | | | |
|---|---|---|---|
| 4,712,191 | 12/1987 | Penna ................................. | 345/353 X |
| 4,823,283 | 4/1989 | Diehm et al. ....................... | 345/352 |
| 5,119,079 | 6/1992 | Hube et al. ......................... | 345/352 |
| 5,295,243 | 3/1994 | Robertson et al. ................. | 345/357 X |
| 5,463,727 | 10/1995 | Wiggins et al. ................... | 345/353 |
| 5,546,529 | 8/1996 | Bowers et al. .................... | 345/357 X |
| 5,565,888 | 10/1996 | Selker ................................. | 345/146 |
| 5,760,776 | 6/1998 | McGurrin et al. ................. | 345/353 |
| 5,784,059 | 7/1998 | Morimoto et al. ................ | 345/353 |
| 5,798,760 | 8/1998 | Vayda et al. ....................... | 345/352 |

FOREIGN PATENT DOCUMENTS

| | | | |
|---|---|---|---|
| 0 476 972 | 3/1992 | European Pat. Off. ........ | G06F 3/033 |
| 0 27 730 | 8/1996 | European Pat. Off. ........ | G03F 3/022 |

OTHER PUBLICATIONS

"Expandable Targets for Efficient Selection via a Screen Cursor" IBM Technical Disclosure Bulletin, vol. 35, No. 3, Aug. 1, 1992, pp. 438–439, XP000326335.

"Defaulting Cascade Menus Presentation and Interaction" IBM Technical Disclosure Bulletin, vol. 35, No. 6, Nov. 1, 1992, pp. 138–139, XP000314088.

*Primary Examiner*—John E. Breene
*Attorney, Agent, or Firm*—Frommer Lawrence & Haug, LLP.; William S. Frommer

[57] ABSTRACT

Multiple items forming a menu are displayed on a screen in a computer system. As the user refers to a menu item via an input device, that particular item is displayed in increased size. As soon as the user moves to another menu item, this newly referenced item becomes larger than the other menu items, while the previously referenced item is reduced to its original size. If the user-referenced item has a sub-menu associated with it, then the size of that sub-menu increases— while the menu size is decreased—as the user moves from the menu to the sub-menu.

12 Claims, 3 Drawing Sheets

MENU SELECTION WITH MENU STEM AND SUBMENU SIZE ENLARGEMENT

BACKGROUND OF THE INVENTION

The present invention is related to a Graphical User Interface (GUI) and, in particular, a method for graphically displaying on a computer screen a plurality of items forming a menu, such that a menu item representing a particular function operated on by a user is clearly visible on the screen.

Pull-down menus are well known in the art and are possibly one of the most common tools in the Graphical User Interface. From a pull-down menu, a user can issue a computer command, initiate an action, set parameters for a particular operation, etc.

Since this pull-down menu structure is so popular, occasionally the entire viewing screen is not sufficient to display all of the menu options, i.e., items, available to the user. This is particularly true if each of the menu items occupies a large area on the screen to provide the user with a readable, easy to understand format. In this case, the user must scroll the display—using an input device—past the current view, either in the vertical or horizontal direction, to get more viewing area such that the additional items can be seen. This scrolling operation may be inconvenient and time consuming for the user.

Furthermore, traditional pull-down menus feature cascading menus which are typically sub-menus of the main menu pertaining to a particular item within the main menu. Each sub-menu can have several of its own sub-menus, and so on. Obviously, there can be many levels of these sub-menus, each relating to an item in the "parent" menu. In this case, the viewing area on the screen may not be sufficient to provide sufficient space for each item while allowing the user to comprehend its contents. Scrolling the sub-menus off the screen presents difficulties in addition to the ones as mentioned above, as the user may "lose" track of where he or she is in the overall scheme of things (i.e., which item this particular sub-menu is remotely related to).

A need, therefore, exists for an invention to overcome the above disadvantages of the current menu structure.

OBJECTS OF THE INVENTION

It is an object of the present invention to provide a user manipulated menu structure that is easily readable by the user.

It is another object of the present invention to provide a menu item, which the user is currently referring to in the menu, as clearly viewable on the screen.

It is a further object of the present invention to provide a sub-menu, which the user is currently referring to, as clearly viewable on the screen.

It is still another object of the present invention to provide a sub-menu, which the user is currently referring to, as clearly viewable on the screen while many levels of sub-menus may separate this sub-menu from the main menu all displayed on the single screen.

SUMMARY OF THE INVENTION

These and other objects, features and advantages are accomplished by a method and system for displaying on a screen a plurality of items forming a menu. A user refers to each menu item via an input device such that each item represents an operation to be performed by a computer system. A menu item is then obtained from those menu items displayed on the screen in response to the user referring to this menu item via the input device. The respective size of this menu item is increased to a predetermined size which is larger than any size of those other displayed menu items.

In accordance with one aspect of the present invention, the size of the menu item is reduced if the user no longer refers to it on the screen, e.g. is no longer using its function. In one embodiment, the size of the menu item is reduced in such a way as to be substantially the same as the respective sizes of those other menu items.

In accordance with another aspect of the present invention, the size of a first menu item decreases and the respective size of a second menu item increases when the user no longer refers to the first menu item but refers to the second menu item.

In accordance with yet another aspect of the present invention, another plurality of items which pertain only to one menu item and which form a sub-menu are displayed on the screen when the user refers to that menu item on the screen. The size of the sub-menu is larger than the size of the menu: the size of the menu is reduced while the size of the sub-menu becomes substantially the same as the size of the menu prior to its reduction.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which.

In all Figures, like reference numerals represent the same or identical components of the invention.

DETAILED DESCRIPTION OF THE PREFERRED EMBODIMENTS

The invention will now be explained in detail with reference to the accompanying drawings.

Figure 1A:
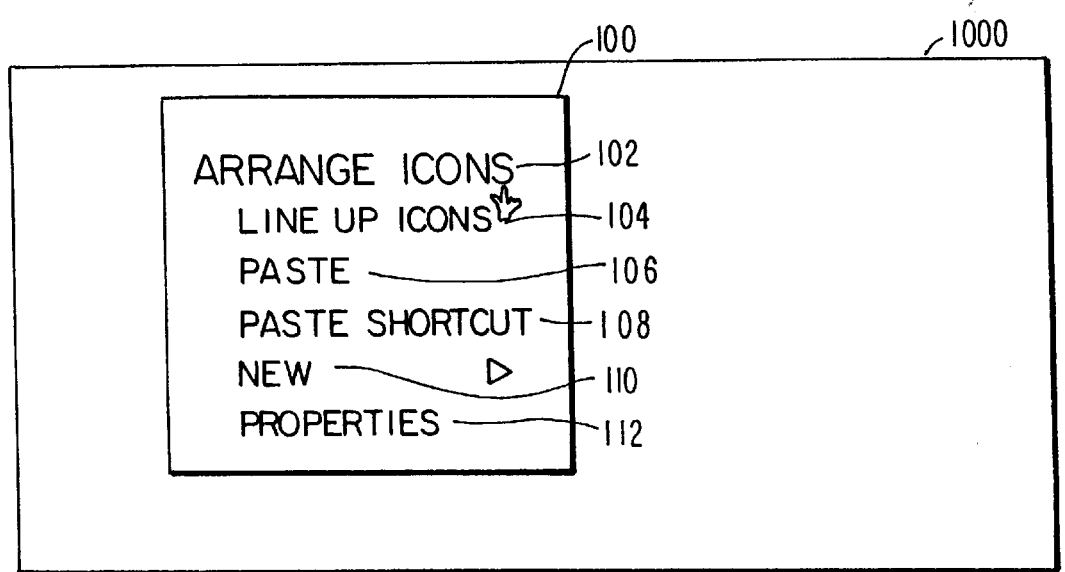
FIG. 1A is a display screen displaying various menu items and one menu item in particular in accordance with the present invention.

FIG. 1A represents a display screen 1000 displaying various options, i.e., items 102, 104, 106, 108, 110, 112, arranged in a north-south configuration. The items form a menu 100 on the screen 1000 of the computer system, as known in the art.

The user refers to each menu item via an input device (not shown), such as a mouse, light pen, keyboard, etc., where each item represents an operation to be performed by the computer system. Representative operations may include displaying an image on the screen, "cutting and pasting" text, lining up icons, etc.

In accordance with one aspect of the present invention, when the user selects, i.e., refers to, a menu item via the input device, that menu item is obtained from the displayed menu items. The item referred to by the user is increased in size, as shown in FIG. 1A. Once the size of the item reaches a predetermined threshold, which is larger than any respective sizes of those other menu items displayed on the screen, it is no longer increased.

For example, as shown in FIG. 1A, the user points a cursor in the form of an index at "Arrange Icons" (item 102) in the menu. As soon as the user references that item, its size becomes larger than any other item in the menu, i.e., items 104, 106, 108, 110 and 112. That is, the displayed contents (e.g. the description) of the referenced item are increased so that the user can easily identify where in the menu he or she is, and whether to initiate that particular operation.

More importantly, however, according to the present invention, each of the menu items does not have to occupy a large area on the screen to have its contents readily visible to the user. Just the opposite, each menu item may occupy a relatively small display area on the screen. As the user browses through the menu using the cursor, each item indicated by the user "zooms in" toward the user so that its contents become easily identifiable. And as long as the user refers to this item by pausing the cursor, for example, on it, the size of the item stays larger than the corresponding sizes of other items on the screen. The size of the enlarged item is reduced, however, if the user no longer refers to it on the screen. Namely, the size of the menu item no longer identified by the user is reduced in such a way as to be substantially the same as the respective sizes of those other menu items on the screen.

Figure 1B:
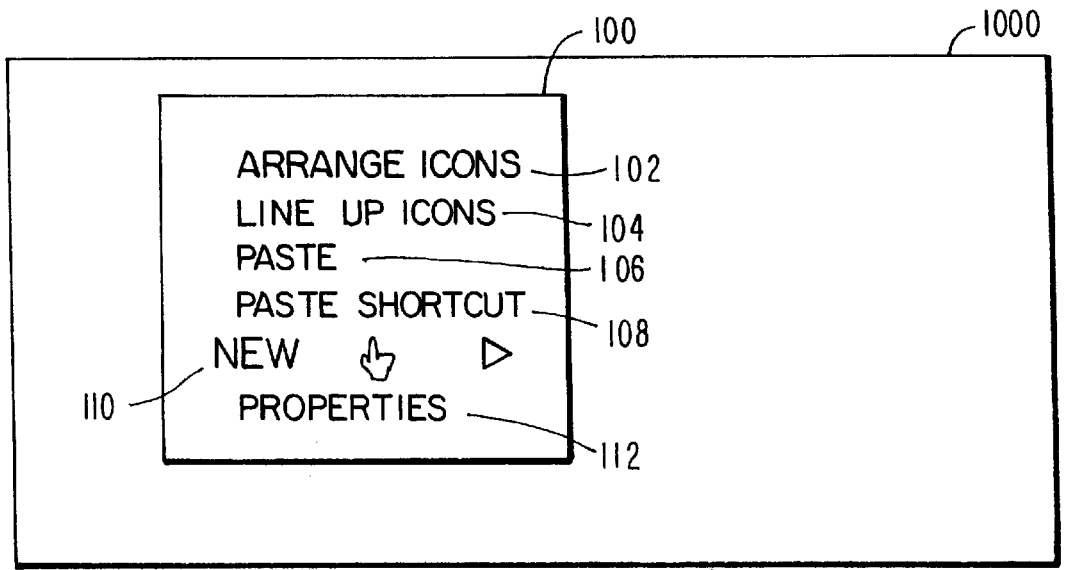
FIG. 1B is a display screen displaying the same items as in FIG. 1A, but identifying another particular item in accordance with one aspect of the present invention.

FIG. 1B illustrates the above operation. When item 102 was referenced, its size was increased as shown in FIG. 1A. After the user moved to "New" (item 110), "Arrange Icons" (item 102) returned to its original size, which is identical to all other non-referenced size in correspondence to that of the previously referenced item 102 of FIG. 1A. That is, the size of the first menu item decreases and the respective size of the second menu item increases when the user no longer refers to the first menu item, but instead refers to the second menu item.

It will be appreciated that while the above description noted that the size of the item is increased or decreased accordingly, actually the item contents including text increase or decrease in size in correspondence with the size increase of the menu item. This is also clearly illustrated in FIGS. 1A and 1B.

In accordance with another aspect of the present invention, another plurality of items which pertain only to one particular menu item and which form a sub-menu are displayed on the screen when the user refers to that menu item on the screen. In particular, FIGS. 1A and 1B show that "New" (item 110) contains a graphical symbol indicating the presence of a sub-menu pertaining to that item. As further illustrated in FIG. 2A, when the user selects item 110, a sub-menu 200 appears on the screen 1000. The sub-menu 200 representatively contains four items: "Folder" (item 202), "Shortcut" (item 204), "Text Document" (item 206) and "Image"(item 208) pertaining to "New" (item 110).

In accordance with this aspect of the present invention, the size of the sub-menu 200 is larger than the size of the menu 100 on the screen 1000. Namely, when the user points to any item on the sub-menu, as illustrated by the index in FIG. 2A, the size of the menu 100 is reduced to a predetermined size while the size of the sub-menu 200 (in one embodiment of the present invention) becomes substantially the same as the size of the menu 100 prior to its reduction.

Figure 2A:
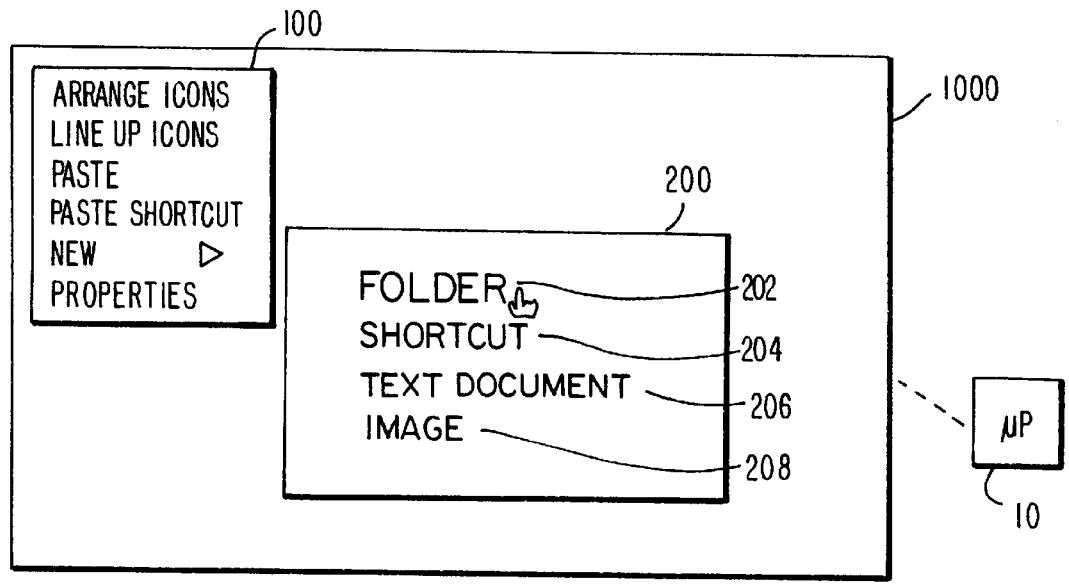
FIG. 2A is a display screen displaying the same items as in FIGS. 1A and 1B, wherein the particularly identified item has a sub-menu related to it and displayed in accordance with another aspect of the present invention.

Those items in the sub-menu 200 being referred to by the user become larger in size than other items in the sub-menu 200. That is, in response to the user referring to the sub-menu item via the input device, that item is displayed at a predetermined size which is larger than any respective sizes of those other sub-menu items displayed on the screen 1000, as shown in FIG. 2A.

Figure 2B:
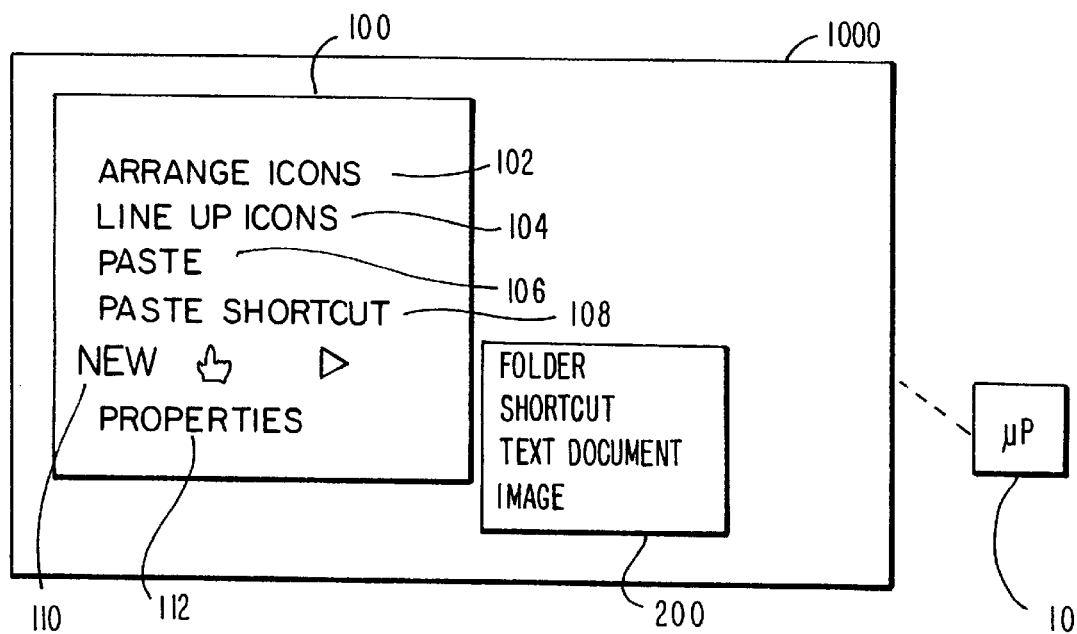
FIG. 2B is a display screen displaying the same items as in FIGS. 1A, 1B and 2A, wherein the sub-menu and the main menu are displayed in accordance with yet another aspect of the present invention.

As long as the user lingers over the sub-menu items, those items referred to by the user increase in size, and then decrease correspondingly as other sub-menu items are referenced. Once the user, however, moves back to the menu 100 via the menu item 110, the size of the sub-menu 200 is reduced. While the sub-menu "shrinks" on the screen, the main menu "grows" to substantially the same size as the sub-menu size prior to its reduction, as shown in FIG. 2B. Since the user is currently pointing to "New" (item 110), the size of item 110 is increased accordingly as it reflects the user interest, while all other items including the sub-menu become inconspicuous and occupy very little screen display area being of little interest to the user at the present time.

Furthermore, after the user moves—in the menu 100—away from "New" (item 110), the sub-menu 200 is removed from the display screen 1000. This situation is represented by FIG. 1A, for example.

It is understood, of course, that if a particular item in the sub-menu 200 has its own sub-menu associated with that item referred to by the user, then that sub-sub-menu is displayed on the screen as being larger than either the sub-menu 200 or menu 100.

It is also understood that the menu 100 may occupy only a portion of the screen, and not the entire screen, as in the previous examples of FIGS. 1A and 1B shown for the sake of clarity only. In this respect, several menus and/or sub-menus, etc. may appear on the screen arranged in different configurations as noted above.

It is further understood that two or more items in the menu 100 can contain the sub-menu symbols. Those items which currently do not have their sub-menus displayed may, for example, have their sub-menu symbols removed from the screen 1000 in order to indicate to which item in the menu 100 the sub-menu 200 belongs. Alternatively, "New" (item 110) may have its sub-menu symbol highlighted, underlined, increased, displayed in a different color, etc. in order to indicate the link with the sub-menu 200.

Figure 3:
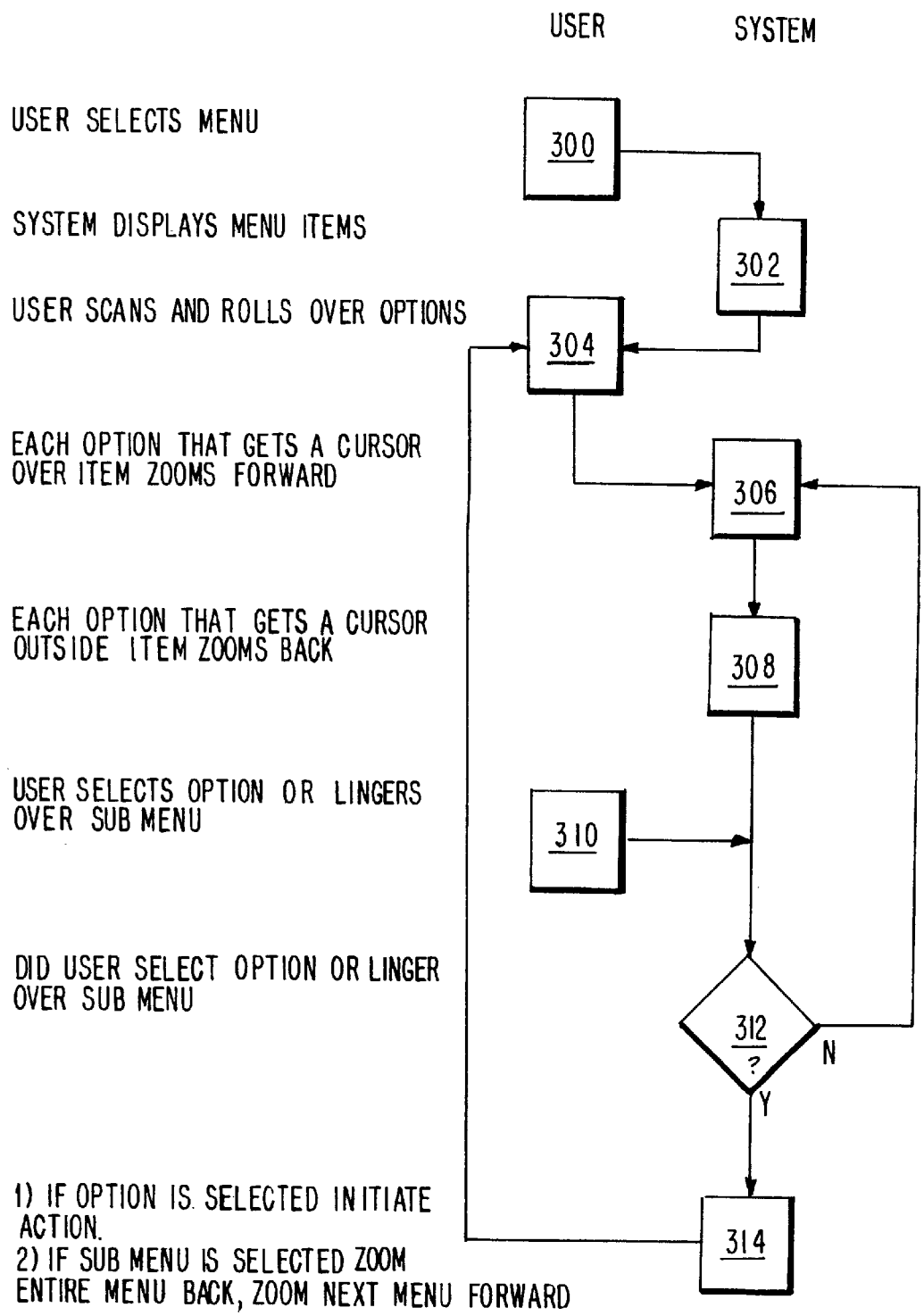
FIG. 3 is a sequencing flowchart for displaying menu items in accordance with the present invention.

FIG. 3 is a sequencing flowchart representing the operation of a processor for displaying menu items in accordance with the present invention. In step 300, the user selects a menu on the screen, and the system displays the requested menu in step 302. Via an input device, the user scans and "rolls over" various options (i.e., menu items) in the menu in step 304: each option identified by a cursor from the input device "zooms forward" in step 306; and those options that are not identified by the cursor "zoom backward" in step 308.

In step 310, the user may select the option in the menu identified by the cursor or linger over an item in the sub-menu, and until either of these two user actions occur, steps 306 and 308 are repeated by the system as determined in inquiry 312. Following the user action in step 310, the system initiates a corresponding operation if a particular menu option is selected. Alternatively, if the sub-menu is referenced, then the entire menu is "zoomed back" while the sub-menu is "zoomed forward" as in step 314.

According to the present invention, all of the menus and their corresponding items may appear relatively small on the display screen, except for the menu and/or item of interest to the user as indicated by a cursor, for example. This configuration allows many items to be displayed on a single screen without requiring the user to perform the scrolling operation for additional menu items.

Furthermore, according to the present invention, when the user lingers over a sub-menu, the main menu "zooms out" but remains visible on the screen. The original menu occupies less area than before, while the sub-menu "zooms in", becoming of interest to the user as desired. This operation can continue for many more sub-menus than would otherwise be possible, always maintaining previous menus visible for user access.

It will also be appreciated that the menus in the previous examples do not necessarily have to have the shape of a column. Without detracting from the present invention, the menus may appear in any arrangement as known in the art: circles, rows, arcs, north-south-east-west, etc.

FIGS. 1A, 1B, 2A and 2B show the display screen 1000 under the control of microprocessor 10. It will be appreciated that the microprocessor 10 or any other programmable controller may be programmed to effect the operations of the present invention as described above with reference to those figures and in accordance with the flowchart of FIG. 3.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A method for displaying on a screen in a computer system a plurality of items forming a menu, wherein a user refers to each of said menu items via an input device and each of said menu items represents an operation to be performed by said computer system, said method comprising the steps of:

obtaining a menu item from said menu items in response to said user referring to said menu item via said input device;

increasing a respective size of said menu item to a predetermined size which is larger than any respective size of those other menu items displayed on said screen; and displaying another plurality of items which pertain only to said menu item and which form a sub-menu on said screen when said user refers to said menu item on said screen, wherein a size of said sub-menu is larger than a size of said menu on said screen.

2. The method according to claim 1, wherein the size of said menu is reduced to another predetermined size while said sub-menu is displayed as yet another preselected size on said screen.

3. The method according to claim 2, wherein said sub-menu becomes substantially the same size as the size of said menu prior to its reduction.

4. The method according to claim 3, further comprising obtaining a sub-menu item from said displayed sub-menu items in response to said user referring to said sub-menu item via said input device, and increasing a respective size of said obtained sub-menu item to still another size which is larger than any respective sizes of those other sub-menu items displayed on said screen.

5. The method according to claim 4, further comprising reducing the size of said sub-menu to said reduced another predetermined size of said menu and increasing the size of said menu to substantially the same as the size of the sub-menu prior to its reduction if said user no longer refers to any of said sub-menu items.

6. The method according to claim 4, further comprising removing said sub-menu from display on said screen if said user no longer refers to said menu item to which said sub-menu pertains.

7. A method for displaying objects on a screen in a computer system including an input device, comprising:

displaying a plurality of items forming a menu, each of said menu items being referred to via said input device and each of said menu items representing an operation to be performed by said computer system;

displaying another plurality of items associated with a preselected menu item in said first-mentioned plurality of items, said second-mentioned plurality of items forming a sub-menu on said screen when referring to said preselected menu item on said screen via said input device; and increasing said sub-menu to a predetermined size such that the size of said sub-menu is larger than a respective size of said menu on said screen.

8. The method according to claim 7, further comprising decreasing the size of said menu to another predetermined size on said screen.

9. The method according to claim 7, further comprising obtaining a sub-menu item from said second-mentioned plurality of items in said sub-menu when referring to said sub-menu item via said input device, and increasing a respective size of said sub-menu item which is larger than any respective size of those other menu items or sub-menu items displayed on said screen.

10. The method according to claim 9, further comprising reducing the respective size of said sub-menu item when no longer referring to said sub-menu item on said screen, the respective size of said sub-menu item becoming substantially the same as the respective sizes of those other sub-menu items.

11. The method according to claim 7, further comprising reducing the increased size of said sub-menu to the size of said menu and increasing the size of said menu to substantially the same as the increased size of said sub-menu prior to its reduction when no longer referring to any of said sub-menu items in said sub-menu.

12. The method according to claim 11, further comprising removing said sub-menu and sub-menu items from display on said screen when no longer referring to said preselected menu item associated with said sub-menu.

* * * * *